United States Patent [19]

Spahlinger

[11] Patent Number: 5,123,741
[45] Date of Patent: Jun. 23, 1992

[54] FIBER OPTIC SAGNAC INTERFERROMETER WITH DIGITAL PHASE RAMP RESETTING VIA CORRELATION-FREE DEMODULATOR CONTROL

[75] Inventor: Günter Spahlinger, Stuttgart, Fed. Rep. of Germany

[73] Assignee: LITEF GmbH, Freiburg im Breisgau, Fed. Rep. of Germany

[21] Appl. No.: 652,422

[22] Filed: Feb. 6, 1991

[30] Foreign Application Priority Data

Feb. 12, 1990 [EP] European Pat. Off. ........ 90102739.1

[51] Int. Cl.⁵ .............................................. G01C 19/72
[52] U.S. Cl. .................................................. 356/350
[58] Field of Search ......................................... 356/350

[56] References Cited

U.S. PATENT DOCUMENTS 4,705,399 11/1987 Graindorge et al. ............... 356/350
5,039,220 8/1991 Arditty et al. ...................... 356/350

FOREIGN PATENT DOCUMENTS 0168292 1/1986 European Pat. Off. .
0294915 12/1988 European Pat. Off. .
0359666 3/1990 European Pat. Off. .
2152207 7/1985 United Kingdom .

OTHER PUBLICATIONS

"Progress in Optical Fiber Gyroscopes Using Integrated Optics", Lefevre et al., 1986.

Primary Examiner—Samuel A. Turner
Attorney, Agent, or Firm—Elliott N. Kramsky

[57] ABSTRACT

A fiber optic interferometer rotation rate sensor is reset by phase ramp via a digital control circuit using as demodulation signal within the control circuit a signal (d) that is statistically independent of all parasitic signals and originates from a modulation signal generator that includes a random number generator. A reversal of the phase modulator signal is provided in a statistically distributed manner to integral values of $\pi/2$ of the interferometer characteristic. The arrangement avoids deadband and removes scale factor nonlinearities, particularly at low rates of rotation.

7 Claims, 11 Drawing Sheets

Fig. 11 DIGITAL SYNCHRONOUS DEMODULATION

Fig. 12

FIBER OPTIC SAGNAC INTERFERROMETER WITH DIGITAL PHASE RAMP RESETTING VIA CORRELATION-FREE DEMODULATOR CONTROL

BACKGROUND

1. Field of the Invention

The present invention relates to fiber optic rotation rate sensors. More particularly, this invention pertains to a fiber optic Sagnac interferometer arrangement for avoiding deadband and removing scale factor nonlinearities, particularly at low rotation rates.

2. Description of the Prior Art

Printed publication DE-A1-3,144,162 describes a method for measuring nonreciprocal phase shifts in a fiber optic Sagnac interferometer ("ring interferometer") by readjusting the nonreciprocal phase shifts (e.g. on the basis of rates of rotation) by applying, on the one hand, a phase deviation having a specific amplitude that can be reversed with the frequency $f_0 = \frac{1}{2}t_0$ and, on the other hand, a saw-toothed voltage that likewise shifts the phase deviation, $t_0$ designating the transit time of each of the light beams through the fiber coil, to the phase modulator located in the region of the fiber coil input. The gradient of the compensating or resetting saw-toothed voltage (phase ramp) corresponds to rotation rate and is, thus, proportional to $\phi_0/t_0$ where $\phi_0$ is the nonreciprocal phase shift caused, for example, by a rotational movement. In practice, however, it is barely possible to employ the so-called phase ramp resetting method described in the above-referenced publication. This is due to the fact that inertial rotation rate measurements require accuracies with respect to the reversible phase deviations, amplitude or gradient of resetting signal and proportionality or scale factor that analog circuit design cannot necessarily guarantee.

U.S. Pat. No. 4,705,399 teaches an advance in the above-identified ramp resetting method for fiber optic ring interferometers that operates entirely digitally for signal evaluation and conditioning. As a result, the required signal precision, particularly with respect to accuracy of the reversible phase deviations and ramp resetting signal, can be obtained by a unique allocation of an automatic measuring range reversal and a correction of the scale factors.

The functional principle of the digital phase ramp resetting method of the prior art is first explained with reference to FIG. 3. (FIG. 3 corresponds, in a simplified way, to the prior art disclosed in FIG. 14 of U.S. Pat. No. 4,705,399. cf. H. C. Lefevre et al. in Integrated Optics: "A practical solution for the Fiber-Optic Gyroscope", SPIE Vol. 719, Fiber Optic gyros, 1986.)

Figure 3:
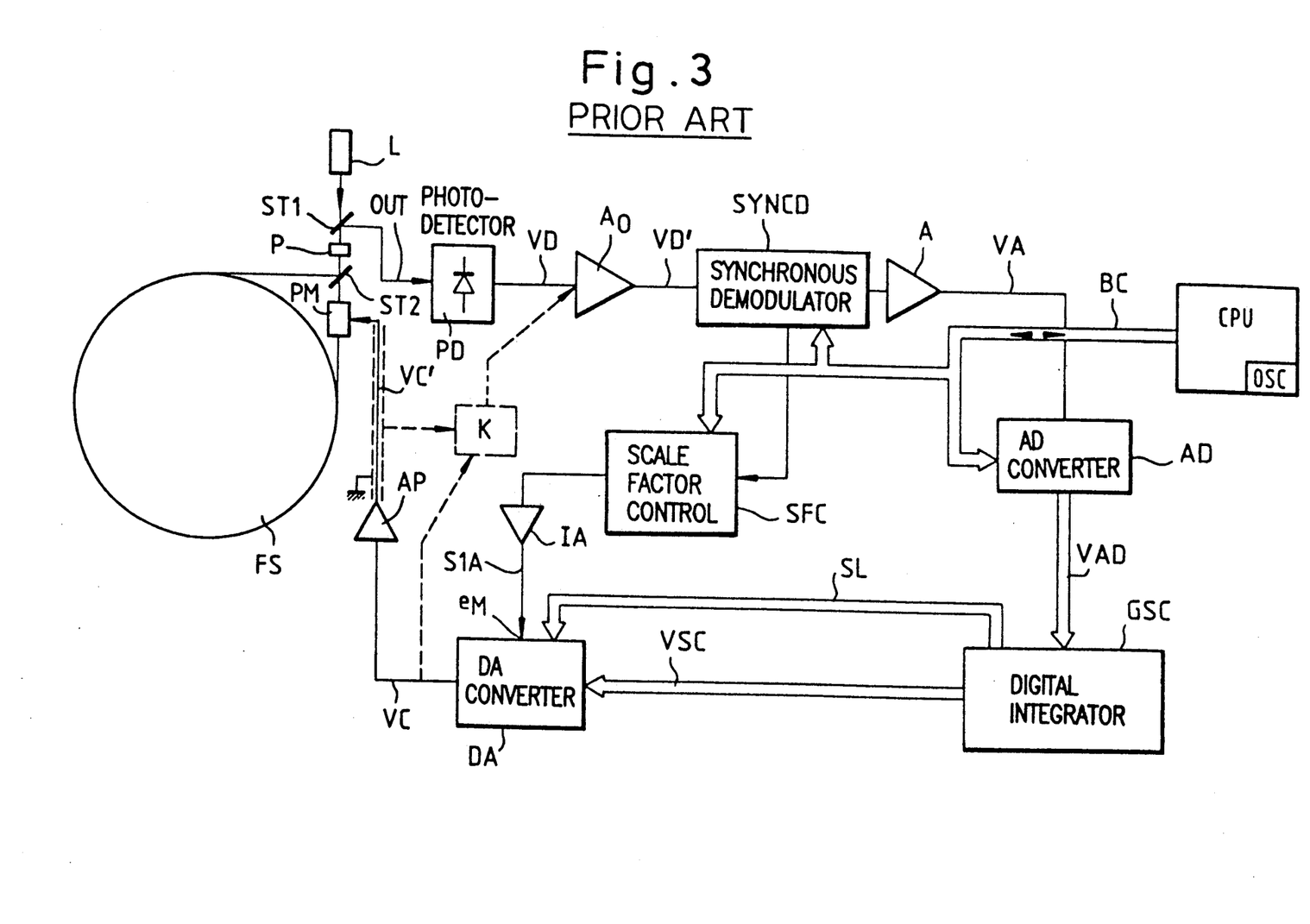
FIG. 3 is a schematic diagram of a fiber optic interferometer in accordance with the prior art with digital processing of the rotation rate signal and generation of the modulation deviation and ramp resetting signals.

The schematic representation of FIG. 3 shows a light source L (e.g., a laser) whose parallel light beams are split into two light beams via a beam splitter ST2, and irradiated into an interferometer fiber coil FS in opposite directions. The fiber coil FS preferably consists of an optical monomode fiber. The beam splitter ST2 simultaneously acts as a mixer for recombining the two light beams after traverse of the fiber coil FS. The interference signal of the two superimposed light beams passes via a second beam splitter ST1 and the output branch AUS to a photodetector PD that scans the intensity of the interference pattern. Using $\Delta\phi_0$ to designate the phase difference between the two light beams that propagate in opposite directions in the closed fiber coil FS, it holds that $\Delta\phi_0 = 0$ as long as there are no nonreciprocal disturbances. Reference should be made to the cited literature concerning the mathematical relation between the phase difference $\phi_0$ and the rotation rate or rotational speed, the optical power density at the input of the photodetector PD, and measuring sensitivity. A method for increasing the sensitivity of the interferometer by introducing a constant, nonreciprocal bias to the two counterrotating light beams in the fiber coil FS so that the counterrotating beams (light waves) are periodically shifted (by a phase modulator PM) to the operating point of highest sensitivity of the interferometer by $(2n+1)\pi/2$ where n is a whole number is also described. The phase modulator PM is first excited with a signal $\phi_1(t)$ that causes a periodic phase shift (e.g., $\pm\pi/2, 3/2\pi, \ldots,$) of period $2t_0$, $t_0$ designating the transit time of a light wave in the fiber coil FS.

In the circuit of FIG. 3, nonreciprocal phase shifts that result from negative feedback to the phase modulator PM are compensated, as described in the referenced patent, by a so-called phase ramp signal, whose gradient is proportional to $\phi/t_0$, where $\phi$ is the nonreciprocal phase shift. The resetting phase ramp signal is a sawtooth or staircase waveform in which the sawtooth amplitude or riser height is equal to $\Delta\phi$ and the duration of the sawtooth or riser corresponds to the transit time $t_0$ or an odd-numbered multiple thereof.

In contrast to an analog solution the digital phase ramp principle described, e.g., in U.S. Pat. No. 4,705,399, possesses a decided advantage in that the scale factors of the phase modulation control and phase ramp resetting signals are corrected, at least in principle, and precise definition of the sawtooth amplitude of the resetting signal is guaranteed.

The function of a circuit in accordance with FIG. 3, i.e., generating a reciprocal phase shift that alternates in time with the frequency $f_0$ and optimizing the operating point and the stairstep ramp resetting signal including scale factor regulation, is explained briefly as follows. The output VD of the photodetector PD is raised by an impedance converter and amplifier $A_0$, whose output signal VD' feeds a synchronous demodulator SYNCD. The demodulator is synchronized to the scanning frequency $f_0 = \frac{1}{2}t_0$. Its output passes as the signal VA through an amplifier A that, as a rule, is combined with a filter, to an analog-to-digital converter AD. The digital output of the converter is proportional to rotation rate and contains an item of sign information with respect to the direction of rotation. The signal VAD then passes to a circuit GSC, that essentially comprises a digital integrator that supplies a combined phase control signal VSC that consists of the digital phase ramp resetting signal and the digital phase modulation signal. The combined digital signal VSC is subsequently converted in a digital-to-analog converter DA to an analog control voltage VC, and transmitted by a driver amplifier AP as control voltage to the phase modulator PM.

The circuit as described is synchronized and controlled by a central processor CPU via a bidirectional bus BC connected to a quartz-stabilized oscillator OSC that supplies frequency $f_0$ through a bidirectional bus BC.

Aside from the number of bits per word (referring to a specific angle of rotation, e.g. four seconds of arc, which bits correspond to the capacity of an adder contained in the circuit GSC) the adder supplies overflow signals SL. In accordance with the overflow signals SL and the clock signal of the oscillator OSC, the central processor CPU generates the various control and synchronization signals. A switchover is made between a "mode A" and a "mode B" in order to enable a scale factor correction, that depends upon the overflow condition of the modulation deviation. The switchover is made in such a way that a modulation deviation of, for example, $\pm 3/2\pi$ holds for mode B. As is described in the above-referenced literature, detected amplitude differences between the operating states with different modulation deviations serve as a measure of the scale factor error at phase ramp signal overflow. To correct such scale factor error, the circuit of FIG. 3 is equipped with a demodulator SFC that detects amplitude differences between the $f_0$ modulation signal in mode A (phase deviation e.g. $\pm\frac{1}{2}\pi$) and mode B (phase deviation e.g. $\pm 3/2\pi$). The SFC transmits the demodulated signal as an analog correction signal SIA via an integrating amplifier IA to a correcting analog input $e_M$ of the digital-to-analog converter DA.

The functional principle of the digital phase ramp resetting method for fiber optic rate-of-rotation sensors in which the gradient of the phase ramp is a measure of the reset rotation rate and in which there is a reversal of the modulation deviation in a ratio 1:3 in the return phase, in order to obtain a correction signal for the scale factor, is described briefly with reference to FIG. 3 and leads, in practical operation of such parasitic rotation rate measuring devices to substantial difficulties as discussed below.

The switching over from "mode A" to "mode B" is directly dependent upon the ramp value of the resetting sawtoothed signal and, thus, the angle of rotation of the gyroscope. In this regard, a ramp traversal can correspond to an angular increment of, for example, approximately four seconds of arc. However, via the trebling of the amplitude of the modulation signal and through parasitics in the sensitive signal path of the photodetector signal VD, modulation degree reversal causes a shift or switching-over of the gyroscope bias. Such undesired parasitic effects are indicated by dashed lines and the coupling factor K of FIG. 3. Since modulation deviation signal reversal is, however, dependent upon the angle of rotation, this leads to gyroscope deadband or lock-in. As explained below, this effect also leads to a scale factor nonlinearity outside the lock-in zone.

As is shown in FIG. 13 of U.S. Pat. No. 4,705,399, the mean intensity I of the photodetector signal VD will differ in the case of modulation deviations of mode A from that in the case of modulation deviations of mode B given the occurrence of a scale factor error. This intensity difference is integrated in the integrating amplifier IA and supplies the analog correction signal at the input $e_M$ of the digital-to-analog converter DA. The frequency of change in intensity is equal to the frequency of change from mode A to mode B, and thus equals the ramp signal return frequency as reversal (e.g., from mode A to mode B), is produced by ramp overflow (i.e., the signal SL of an adder). This frequency of change is proportional to the rotation rate. That is, in accordance with the example explained in the referenced patent, a return of $2\pi$ corresponds to an angular increment of 5 seconds of arc; at a 1 Hz return frequency this corresponds to a rotation rate of 5°/h.

In the case of low rotation rates, the frequency of change can become arbitrarily low. Accordingly, the integrating amplifier IA seldom contains intensity difference information. During the arbitrarily long intervals during which the mode does not change, the integrating amplifier IA does not possess such information. Thus, every small electrical zero error at its input causes its output quantity (the scale factor correction signal SIA) to drift. The scale factor is, therefore, susceptible to drifting of the integrating amplifier IA at low rotation rates. The percentage error in the absolute value of rotation rate caused by scale factor drift is small for low rotation rates. However, a sudden sharp rise in rotation rate becomes problematic since the scale factor is still "wrong" and, thus, large errors (absolute value) also will occur in the rotation rate at least until the scale factor control circuit returns to steady state.

It would, therefore seem advisable to remove, or at least reduce, the electromagnetic parasitics (disturbances with a coupling factor K; see FIG. 3) by electromagnetic compatibility measures (EMC measures). That is, one might consider the use of shields (indicated in FIG. 3 by shielding the connecting line from the driver amplifier AP to the phase modulator PM) and the installation of filters in the signal and voltage feed lines. However, the known interferometer design of FIG. 3 presents special EMC problems. The signal VSC or VC, VC' contains the modulation frequency $f_0=\frac{1}{2}t_0$ that is generated in the oscillator OSC or via the processor CPU. However, the photodetector signal VD contains the rotation rate information with the same frequency and phase angle. This signal is detected by the synchronous demodulator SYNCD. The circuit groups that generate the modulation quantity of frequency $f_0$, and the circuit parts that conduct the signal of the same frequency which is sensitive to rotation rate, are closely connected in space and have, by and large, to be fed from a common power supply device. This clearly presents a danger that electromagnetic energy of frequency $f_0$ will parasitically enter the sensitive signal path (signal VD). The use of stop filters for $f_0$ in the signal lines is not possible since the desired signal information is present at such frequency. Undesired parasitics can be reduced only to a certain extent by shielding the amplifier $A_0$ and the synchronous demodulator SYNCD against the rest of the circuit and by filtering their power supply.

A numerical example of the parasitic sensitivity will immediately clarify the particular problems to a person skilled in the art. The spectral component of frequency $f_0$ in the signal VC or VC' is generally located in the range of a few V. By contrast, in the rotation rate signal VD voltages in the range of a few nV correspond—depending upon optical power, detector sensitivity and gyroscope scale factor—to a rotation rate of 1°/h. With such large amplitude differences, an undesired parasitic path will be unavoidable despite all possible EMC measured, as is symbolized in FIG. 3 by the coupling factor K located between the signals VC, VC' and VD. Naturally, due to different parasitic amplitudes, different errors, equivalent to rotation rates, in the signal VD, will be dependent upon the operating state (mode A or B) since, as assumed, the latter has a modulation amplitude three times higher than the former, and thus has a stronger parasitic effect. The different parasitic amplitudes lead, with reference to rotation rates, to different gyroscope zero point errors that are designated as biases $B_a$ or $B_b$, depending upon the instantaneous modulation state (mode A or mode B).

Thus, the ramp gradient of the resetting signal is regulated by the closed control circuit proportional to the sum of the true input rotation rate $D_e$ and the respective bias $B_a$ or $B_b$, depending upon modulation mode.

Figure 1:
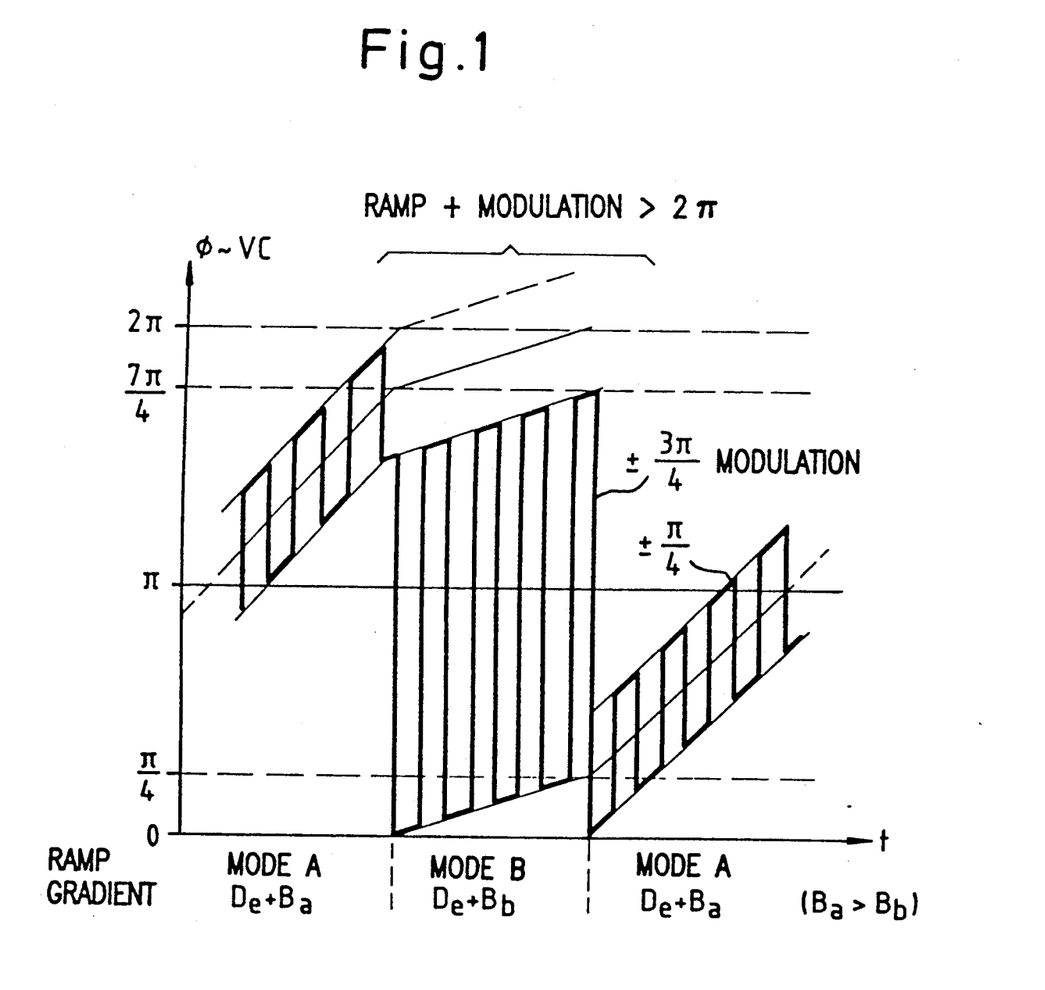
FIG. 1 is a graph of the change of the ramp gradient of the resetting signal, which is dependent, in the prior art, upon the change in modulation deviation or operating mode.

FIG. 1 shows an example in which $D_e+B_a>0$, $D_e+B_b>0$ and $B_a>B_b$ (i.e., different biases $B_a$ or $B_b$ are present). Assuming that $D_e$ is a constant, different ramp gradients are produced depending upon whether mode A or mode B is present at that instant, since ramp gradient is proportional to $D_e+B_a$ or $D_e+B_b$.

In the example of FIG. 1, the gradient during mode B is flatter than i mode A, since $B_b<B_a$. Thus, the dwell time $t_b$ in mode B is larger than the dwell time $t_a$ in mode A than would be the case for biases independent of mode ($B_a=B_b$). However, since not only $B_a$ and $B_b$ but also the input rate of rotation $D_e$ influences the ramp gradient in both modes, the pulse-duty factor of the modes ($T_a/T_b$) also depends upon $D_e$. The scale factor nonlinearity mentioned above results from this.

Figure 2:
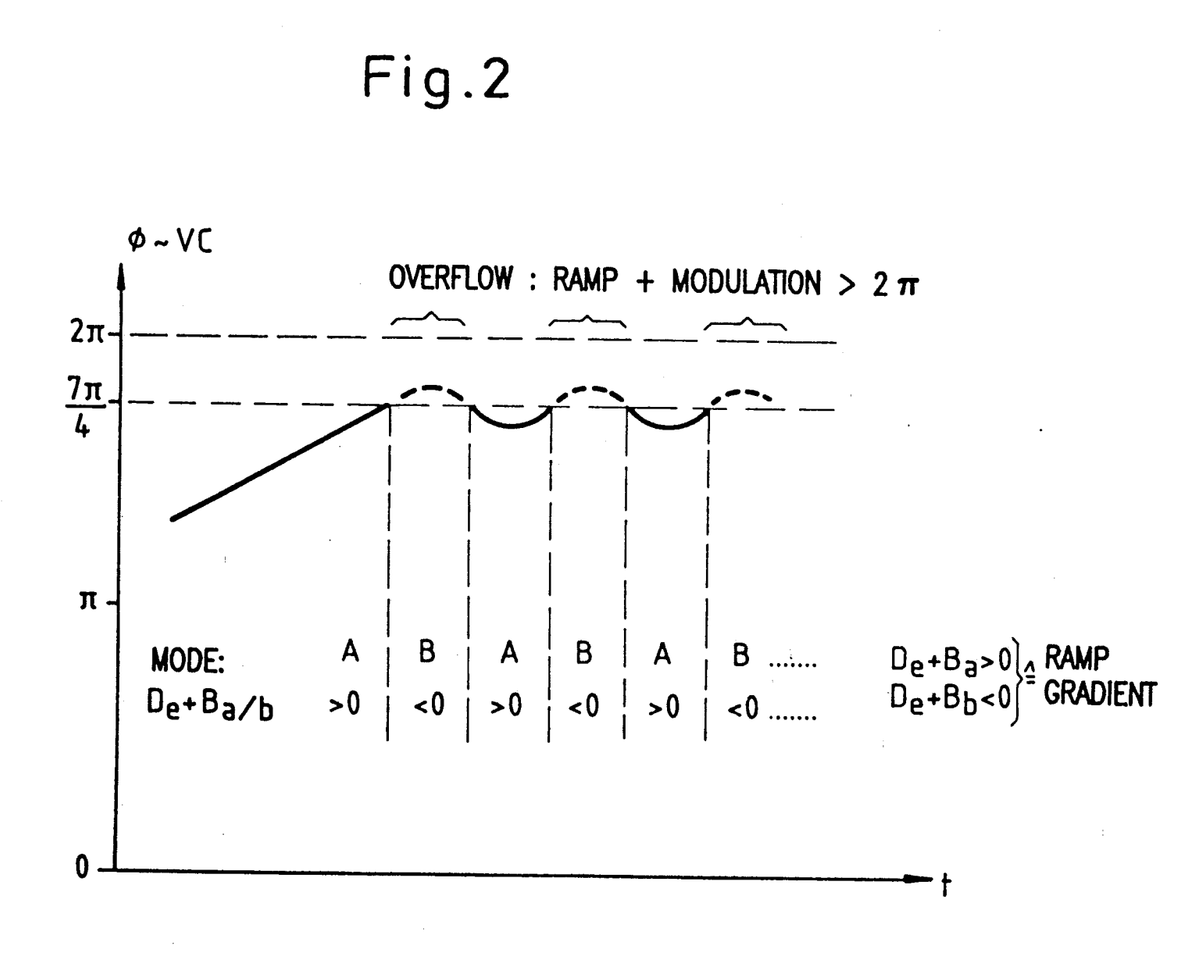
FIG. 2 is a graph that illustrates the lock-in effect for low rates of rotation.

On the other hand, the above-mentioned lock-in effect occurs in a rotation rate range for which the sign of the sum ($D_e+B_a$) or ($D_e+B_b$) differs for the two modes (e.g., ($D_e+B_a$)>0 or ($D_e+B_b$)<0). This case, entirely realistic for low rotation rates, is illustrated in FIG. 2. The ramp of the resetting signal (illustrated without modulation for clarity) starts, for example, in mode A with a positive gradient, since ($D_e+B_a$)>0. When the ramp reaches the (upper) overflow range (overflow signal SL in FIG. 3), a switch is made to mode B. However, the control then triggers a negative ramp gradient, since it now holds that ($D_e+B_b$)<0. Thus, the ramp gradient changes its sign and leaves the overflow region and mode A once again holds. However, a positive ramp gradient is once again associated with mode A until a reversal to mode B once again takes place. Thus, the control is held "captive" and the interferometer is in the lock-in state. How quickly the "zig-zag-ramp" represented in FIG. 2 changes at the overflow limit between modes A and B is determined by the rapidity of the control which is generally very high. The lock-in state holds for an input rotation rate range in which the specified inequalities are fulfilled. The lock-in range thus has a width of $|B_a-B_b|$.

In the description so far, the ramp value is the instantaneous value of the (unmodulated) ramp $\phi(t)$. This is proportional to the angle of rotation (and corresponds to the signal SADD). The ramp gradient $d\phi/dt$ corresponds to the time derivative of the angle of rotation or rotation rate. The problem of the ramp resetting method of the prior art is that the ramp value (value of the angle of rotation) is the criterion for operating mode A or B and whether the different biases $B_a$ or $B_b$ are present and, since $B_a=B_b$, influences the ramp gradient itself. The scale factor error information is present, as mentioned, in the form of a signal of change in intensity, whose frequency is proportional to the rotation rate that can vary between 0 and approximately 100 kHz when the theoretical pulse-duty factor of the modulation deviations between mode A and mode B is 1:3. The apparent advantage of information-carrying changes in intensity occurring more often at high rates of rotation and that, consequently, better scale factor error information is available at high rotation rates, is opposed, however, by the fact that the associated signal processing device has to process a comparatively high frequency range. However, as mentioned, the known ramp resetting method in the region of zero rotation rate leads, on the other hand, to the absence of the scale factor error information and thus to drift problems.

SUMMARY AND OBJECTS OF THE INVENTION

It is, therefore, an object of this invention to avoid lock-in in a fiber optic rotation rate sensor at low rates of rotation.

A further object of this invention is to achieve the foregoing object while obtaining signals that are easy to process to control scale factor.

The preceding and additional objects are addressed by the present invention which provides an improvement in a fiber optic Sagnac interferometer for measuring rotation rate. Such an interferometer is of the type in which two light beams originating from a light source, polarized by a polarizer, and generated by beam splitting are irradiated into a fiber coil in opposite directions and subsequently reunited. After traversing the polarizer, the interference pattern produced is applied to a detector device whose output corresponds to the light intensity of the interference pattern.

The two light beams are modulated by a signal with the aid of a phase modulator located in the fiber coil, combined from a plurality of variable components and limited to a value of $2\pi$ by a modulo operation. A first signal component is a ramp signal generated by an integration process that compensates nonreciprocal incremental phase shifts of the two light beams and a second signal represents a positive value of $\pi/2$ in each case for a time $t_0$ where $t_0$=transit time of each of the light beams through the fiber coil in the rest condition.

The amplified photodetector output signal is fed to a first synchronous demodulator clocked with the frequency $f_0=1/t_0$. The demodulated output signal is integrated and fed back, after digital-to-analog conversion, to the phase modulator to generate the ramp signal to compensate nonreciprocal phase shifts of the light beams. A processor supplies the control and synchronization signals for the first synchronous demodulator, the digital integrator and the ramp generator.

The improvement of the invention resides in that the second signal component consists of the sum of two components, the first formed from alternately consecutive values of 0 and $\pi/2$ and the second formed from consecutive values of 0 and $\pi$ that are largely correlation free. The synchronous demodulator is triggered by the product d(n), corrected for transit time, of four factors. The first of such factors has the constant value $-1$. The second factor is $-1$ when the second component is 0 and $+1$ when the second component is $\pi$. The third factor is $-1$ when the second component of the last preceding modulation clock signal is 0 and $+1$ when the second component of the last preceding modulation clock signal is $\pi$. The fourth factor is $-1$ when the first component is 0 and $+1$ when the first component is $\pi/2$. Before being fed to the synchronous demodulator, the product of the four factors is corrected by a transit time $T_0$ which corresponds to the time $t_0$ and the process time for summation to obtain the second signal component, to combine the first and second signal components to form the trigger signal for the phase modulator and the digital-to-analog conversion.

The foregoing and additional advantages and features of this invention will become further apparent from the detailed description that follows. This description is accompanied by a set of drawing figures in which numerals, corresponding to those of the written description, point to features of the invention, like numerals referring to like features throughout both the written description and drawing figures.

BRIEF DESCRIPTION OF THE DRAWINGS

FIG. 4 is a graph that illustrates the interferometer characteristic with reversal points drawn in;

DETAILED DESCRIPTION

As a preliminary step to facilitate understanding of the invention, first examine that signal processing of the methods described in the literature mentioned above: The phase modulator PM (e.g., circuit of FIG. 3) is fed by an electrical signal that consists of two components, the first a modulation signal that performs a known basic modulation of the interferometer at the reversal points $\pm\pi/2$, $\pm 3\pi/2$ ... of the interferometer characteristic, and the second a resetting signal that compensates the Sagnac effect. The second component is sensitive to the rotation rate and is provided by the control system that reduces the sum of the measured Sagnac phase and resetting phase to zero. Both components, and, thus, the combined trigger signal, are discrete-time staircase functions with a clock time of $t_0$ (the transit time of the light through the fiber coil FS). The phase generated by the phase modulator PM is proportional to the difference of two consecutive values of the discrete-time trigger signal.

Since the interferometer characteristic (FIG. 4) is a function having period $2\pi$, the voltage range of the trigger signal can be limited for phase modulator PM by adding a matching integral multiple of the voltage with phase $2\pi$ to the trigger signal. As taught by the above-referenced patent, use is made of a modulo-operation that limits the trigger signal to a range corresponding to the interval from 0 to $2\pi$. This operation is also designated "Ramp Overflow". The optical power I measured by the photodetector PD is proportional to the value of the instantaneously triggered interferometer characteristic. Since, by virtue of the modulation process represented above, the gradient at the triggered reverse points of the characteristic continually changes sign, the demodulator must once again cancel this effect.

Aside from the goal of triggering the reversal points of the interferometer characteristic to obtain a signal sensitive to rotation rate, the modulation method must also obtain the scale factor error signal. In order to obtain this additional information, at least three different reversal points must be continually triggered. In the method described in U.S. Pat. No. 4,705,399, this is achieved by (automatically occurring) ramp overflow which ensures that, depending upon the instantaneous value of the resetting signal, different pairs of reversal points (i.e., alternating points with positive and negative gradient of the interferometer characteristic) are triggered. Consequently, the demodulation function must be a periodic function of time that assumes the values $+1$ and $-1$ with frequency $\frac{1}{2} t_0$. However, this means that, for the reasons explained above, the demodulator input is sensitive to signals that contain components with this frequency. If such a signal is coupled into the demodulator input, a rotation rate is simulated to the system that is not actually present. That is, a bias error occurs.

If, as explained in the referenced patent, the scale factor modulation is generated by the ramp overflow (i.e., if the modulation deviation is dependent upon the resetting signal), then the bias error is also dependent upon the resetting signal, and the conditions explained above are present for a lock-in zone in the region of low rotation rates.

European patent application No. 90,100,103.2 suggests removing this effect by generating the scale factor modulation independent of the resetting signal. While a bias error remains, it can be reduced to zero on average by a suitable pulse-duty factor for the scale factor modulation and the deadband caused by the bias error no longer occurs. The proposed solution does, however, occasion a higher range of modulation for the phase modulator PM (from $7\pi/2$ in comparison to $2\pi$ in the case of the above-mentioned U.S. patent).

It is recognized that bias errors produced by the coupling of parasitic signals into the demodulator input can be suppressed by a demodulation signal that is statistically independent of all signal sources that contribute to parasitic signals.

On such basis and with a fiber optic Sagnac interferometer, the technical teaching of the invention resides in the second signal component of the combined modulation signal applied to the phase modulator being formed from the sum of two components, the first formed from alternately consecutive values of 0 and $\pi/2$ and the second formed from consecutive values of 0 and $\pi$ that are largely free from correlation, and in that the synchronous demodulator is triggered by the product of four factors. The first of such factors has the constant value of $-1$; the second is $-1$ when the second component of the second signal component is 0 and is $+1$ when the second component is $\pi$; the third is $-1$ when the second component of the preceding modulation clock signal is 0 and +1 when the second component of the preceding modulation clock signal is $\pi$; and the fourth is −1 when the first component is 0 and +1 when the first component is $\pi/2$. The product of the four factors is corrected by a transit time compensation that corresponds to the time $t_0$ and the process time for summation to obtain the second signal component, to combine the first and second signal components to form the trigger signal for the phase modulator and the digital-to-analog conversion.

Figure 5:
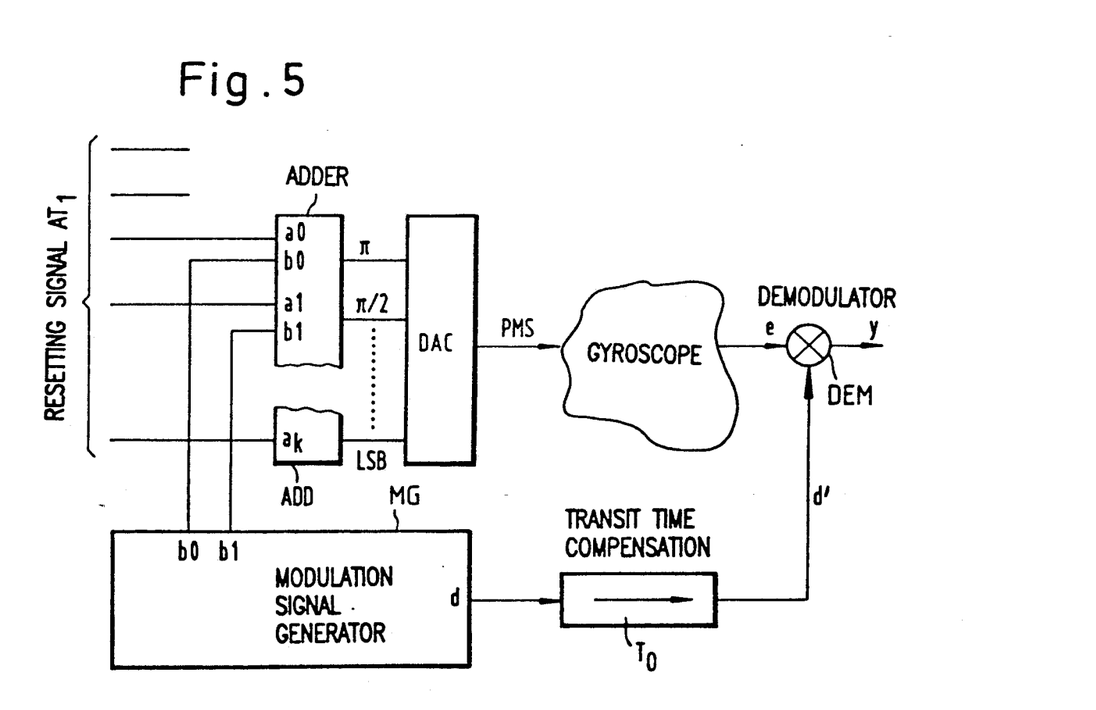
FIG. 5 is a schematic block diagram of an arrangement for generating modulation and demodulation signals in accordance with the invention.

The schematic block diagram of FIG. 5 shows, in fundamental arrangement, the part of a ring interferometer arrangement that is essential for the invention (i.e., those parts and modules which are important for the modulation and demodulation processes). A modulation signal generator MG generates a modulation signal consisting of bits b0 and b1 with significances of $\pi$ and $\pi/2$ respectively. The modulation signal is added (with account taken for place value) to the resetting signal $AT_1$ supplied by the control device (c.f. FIG. 3). The highest-order bit (HOB bit) a0 is allocated the significance $\pi$. The aggregate signal PMS triggers the phase modulator PM via the digital-to-analog converter DA and, thus, the "gyroscope". As mentioned, the HOB bit has the significance $\pi$; all high-order bits are suppressed, so that a modulo-$2\pi$ operation automatically takes place. The output signal PMS of the digital-to-analog converter DA traverses the interferometer (the "gyroscope path") and passes, as a signal that is proportional to the received light intensity I, to the input of the demodulator DEM. The demodulation signal d is supplied by the modulation signal generator MG and passes, after a transit time $T_0$, to the demodulator DEM. The transit time compensation $T_0$ compensates the signal transit times due to the digital-to-analog conversion and the filters located in the gyroscope path and analog-to-digital conversion, so that the demodulation signal "matches" the received signal e.

The modulation signal generator contains a random number generator (from which the signals b0, b1 and d are derived), which guarantees the above-mentioned statistical independence of the demodulation signal d from all sources of disturbance. Alternatively, it is also possible to employ permanently stored signal patterns that are combined in such a way to result in the required statistical independence. The solution using a random number generator provides the basis for the following description.

Figure 4:
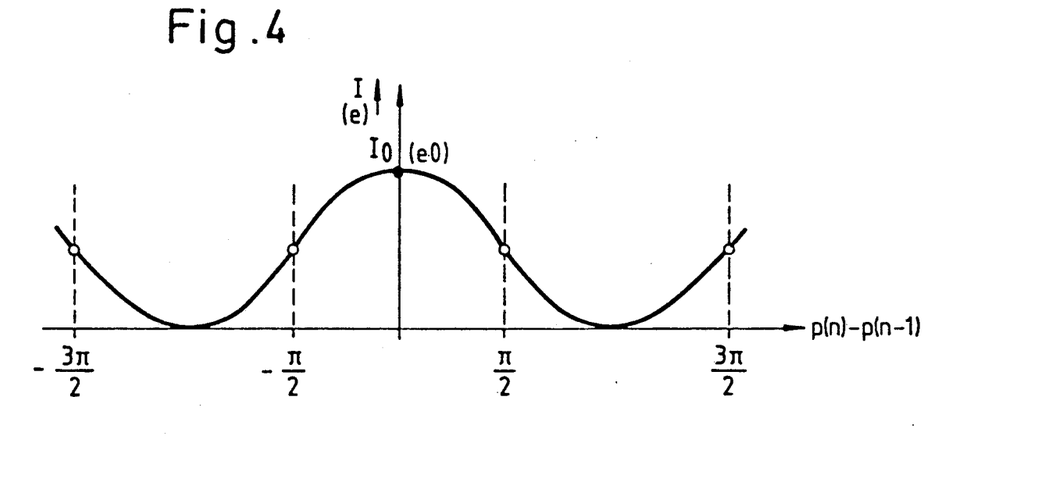

As may be read from the interferometer characteristic of FIG. 4, the reversal points of the gradient to be triggered are located at odd-numbered multiples of $\pi/2$. To the extent that the rate of rotation vanishes (rest condition), the interferometer phase consists of the difference between the instantaneous modulator phase $p(n)$ and the temporally preceding modulator phase $p(n-1)$. To assure that this difference is always an odd-numbered multiple of $\pi/2$, $p(n)$ must be alternately an even-numbered or odd-numbered multiple of $\pi/2$. That is, the bit b1 is supplied from the modulation signal generator MG and must continually oscillate <with the significance $\pi/2$>:

$$b1(n) = \{\ldots 0,1,0,1,0,1,0,1\}$$

This bit b1(n) is generated from an internal signal s(n)

$$s(n) = (-1)^n$$

$$b1(n) = (s(n)+1)/2$$

The bit b0 from the modulation signal generator MG is arbitrary initially and can be used as the degree of freedom for the selection of points with positive or negative gradient of the interferometer characteristic. In the solution proposed herein, the bit b0 is derived from the number sequence R(n) supplied by a random number generator and corresponds in an evenly distributed and statistically independent manner to the values −1 or 1. The bit b0 is yielded as $$b0(n) = (r(n)+1)/2$$

The sign of the respectively activated point of the interferometer characteristic is thus yielded from $$d(n) = -r(n) \cdot r(n-1) \cdot s(n)$$

This sign signal (cf. FIG. 6) is used, after it has passed the chartered time compensation $T_0$, for demodulation of the received signal e.

Figure 6:
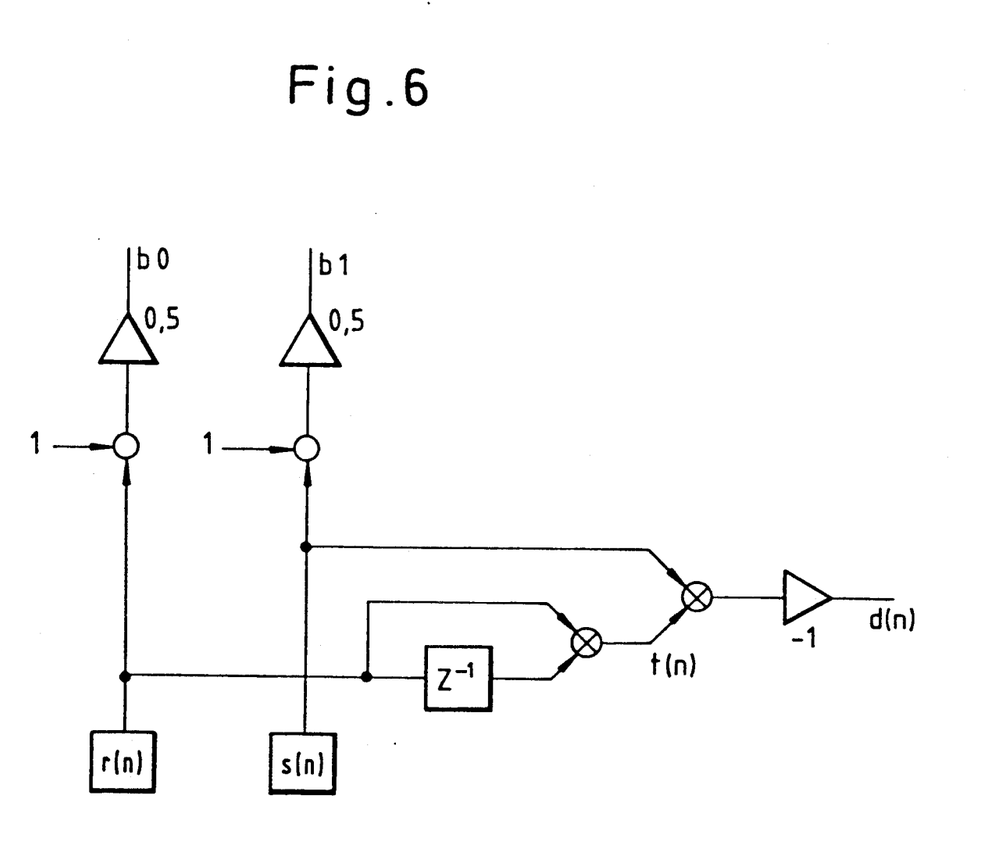
FIG. 6 is a schematic diagram of a modulation signal generator in accordance with the invention.

The design, which follows from the above equations, of the modulation signal generator MG emerges from FIG. 6. The signal d(n) is statistically independent of s(n) although s(n) is used for its generation. However, in the formation of d(n), s(n) is completely rescrambled by multiplication by the product $r(n) \cdot r(n-1)$ formed from random numbers. The demodulation signal d(n) is, however, also statistically independent of r(n) since $t(n) = r(n) \cdot r(n-1)$ is statistically independent of r(n) (i.e., the cross-correlated Crt(i) between r(n) and t(n) is identically equal to zero). This is evident for $i \neq 0$ and 1 because the numbers (shifted with respect to one another by 0 or 1 positions) of the series r(n) and t(n) no longer carry any common information. For i=0 or 1 the cross-correlated value of Crt(0) or Crt(1) corresponds to the mean value of the series r(n) which is assumed to be equal to 0.

The correlation between r(n) and t(n) can be represented as follows:

It holds that $t(n) = r(n) \cdot r(n-1)$ $$Crt(i) = \lim_{N \to \infty} \frac{1}{2N} \sum_{n=-N}^{N} r(n) \cdot t(n+i)$$

$$Crt(0) = \lim_{N \to \infty} \frac{1}{2N} \sum_{n=-N}^{N} \underbrace{\frac{r(n) \cdot r(n)}{=1}} \cdot r(n-1) = r(n) = 0$$

$$Crt(1) = \lim_{N \to \infty} \frac{1}{2N} \sum_{n=-N}^{N} \underbrace{\frac{r(n) \cdot r(n)}{=1}} \cdot r(n+1) = r(n) = 0$$

For $i \neq 0$ and $i \neq 1$:

$$Crt(i) = 0 \text{ evident!}$$

i.e.

$$Crt(i) = 0 \text{ for all } i$$

It follows from this that d(n) is statistically independent of all signals occurring during the modulation process and of the resetting signal and all signals derived from these in the linear sense so that the preconditions set up at the beginning are fulfilled.

Figure 7:
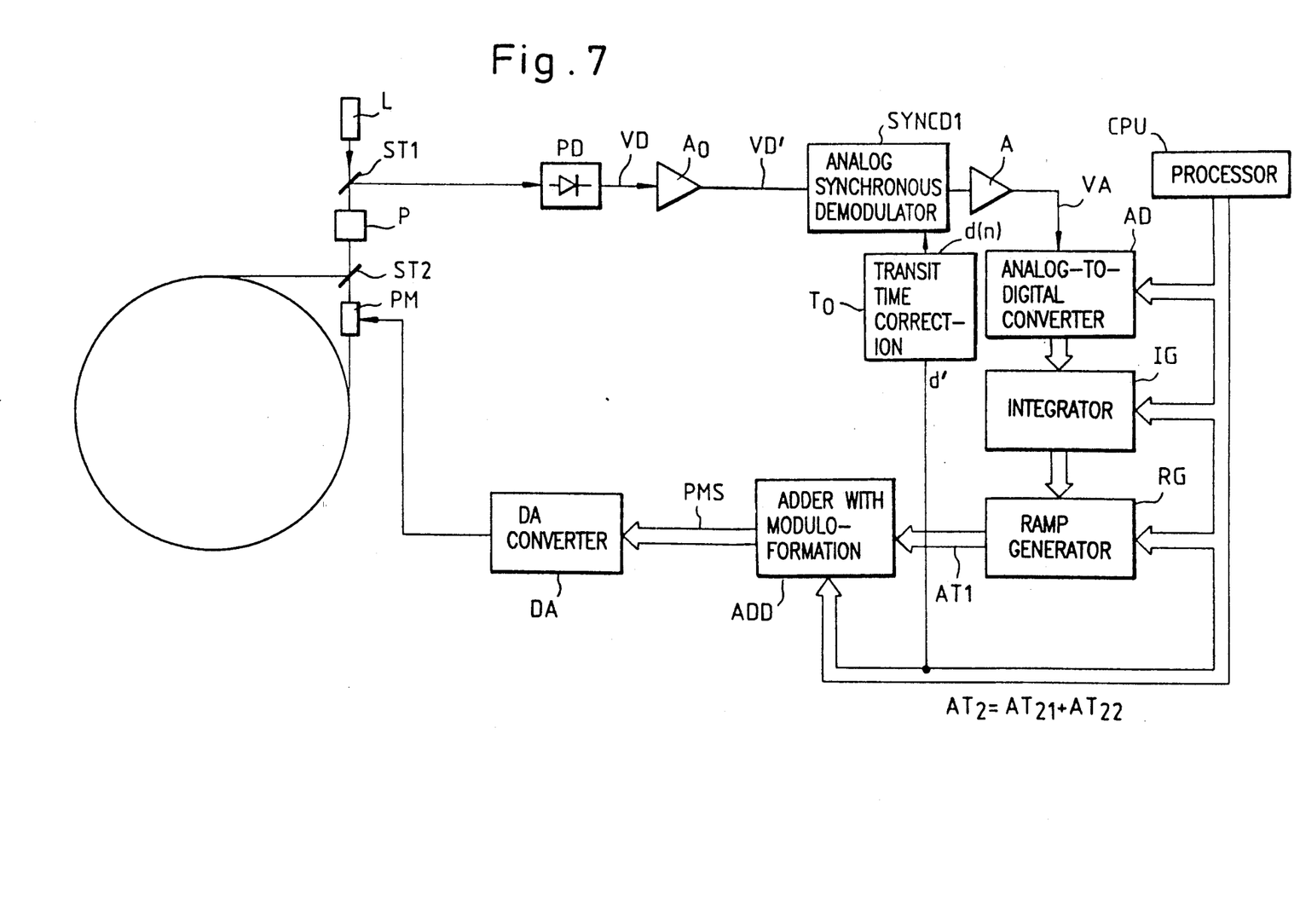
FIG. 7 shows an application of the invention corresponding to the block diagram of FIG. 3 (prior art)

FIG. 7 is an illustrative embodiment of an interferometer arrangement according to the invention in which the scale factor control is not yet in place. The modules known from FIG. 3 and corresponding to the prior art require no further explanation.

As shown, a first signal component $AT_1$ from the ramp signal generator RG of the signal PMS to be fed to the phase modulator PM after digital-to-analog conversion is fed to a first input of an adder ADD with modulo formation. The modules IG (integrator) and RG (ramp generator) correspond in function essentially to the module GSC of FIG. 3. The second signal component $AT_2$, composed of the signal components $AT_{21}$ and $AT_{22}$ is provided by the processor CPU. The above-derived signal d(n) corrected for transit time is applied to the synchronous demodulator SYNCD1.

Figure 8:
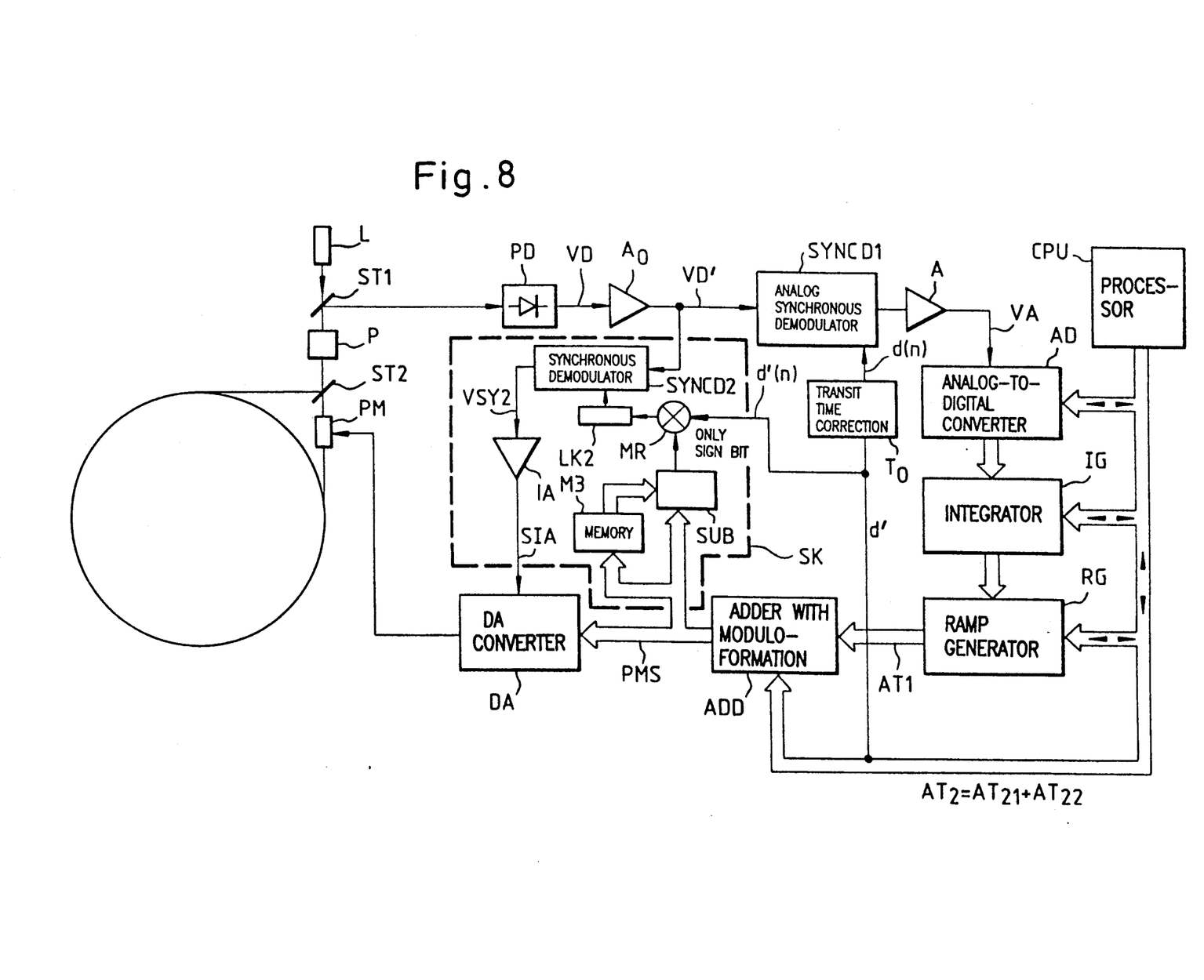
FIG. 8 is a schematic diagram of an interferometer (corresponding to FIG. 7), including a scale factor correction circuit supplemented according to the invention.

The schematic diagram of FIG. 8 corresponds to FIG. 7 and contains as an important supplement a scale factor correction circuit SK. The circuit SK comprises a second synchronous demodulator SYNCD2, whose design can correspond to the synchronous demodulator with this function in the circuit according to FIG. 14 of U.S. Pat. No. 4,705,399. That is, it essentially comprises a number of different amplifiers. The amplified photodetector signal VD' is fed to the signal input of the synchronous demodulator SYNCD2. The signal d'(n), corrected for sign, is fed via a multiplier MR— corrected for transit time by a matched value $T_0'$ —to the demodulator input. A subtracter SUB is applied to the second input of the multiplier MR which continues to subtract the last output value of the adder ADD (acquired from the actual output value of the adder ADD via a memory ME). The output VSY2 of the second synchronous demodulator SYNCD2 feeds the input of an integrating amplifier IA, which essentially comprises a filter dimensioned in accordance with the known control engineering principles, whose output signal SIA corresponds to at least one component of the time integral of the input signal VSY2. SIA is fed as an analog signal to a correction input of the digital-to-analog converter DA which, in turn, supplies as its output the signal applied to the phase modulator PM. This signal is essentially proportional to the product of the signals PMS (digital) and SIA (analog).

Figure 9:
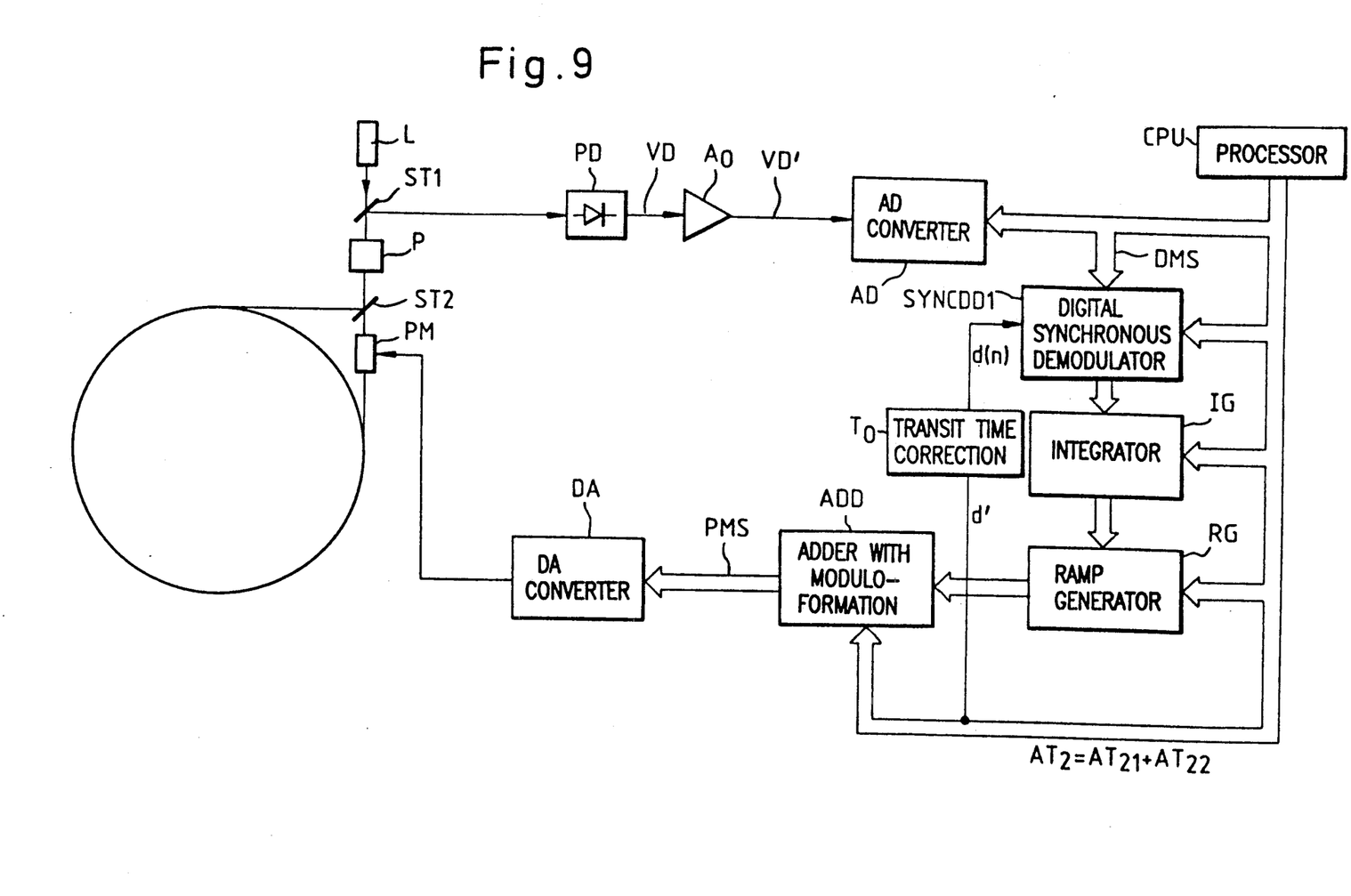
FIG. 9 is a schematic diagram of an interferometer generally in accordance with that of FIG. 7 in which analog-to-digital conversion of the interferometer signal occurs immediately after signal amplification (and consequently a digital synchronous demodulation is applied)

In the circuit illustrated by the schematic diagram of FIG. 9 (generally corresponding to that of FIG. 7), the amplified photodetector signal VD' is directly converted in an analog-to-digital fashion (before further work) and then applied to a digital synchronous demodulator SYNCDD1. The signal d(n) is also present at the demodulator input. Otherwise, the design of the circuit of FIG. 9 substantially corresponds to that of FIG. 7.

Figure 11:
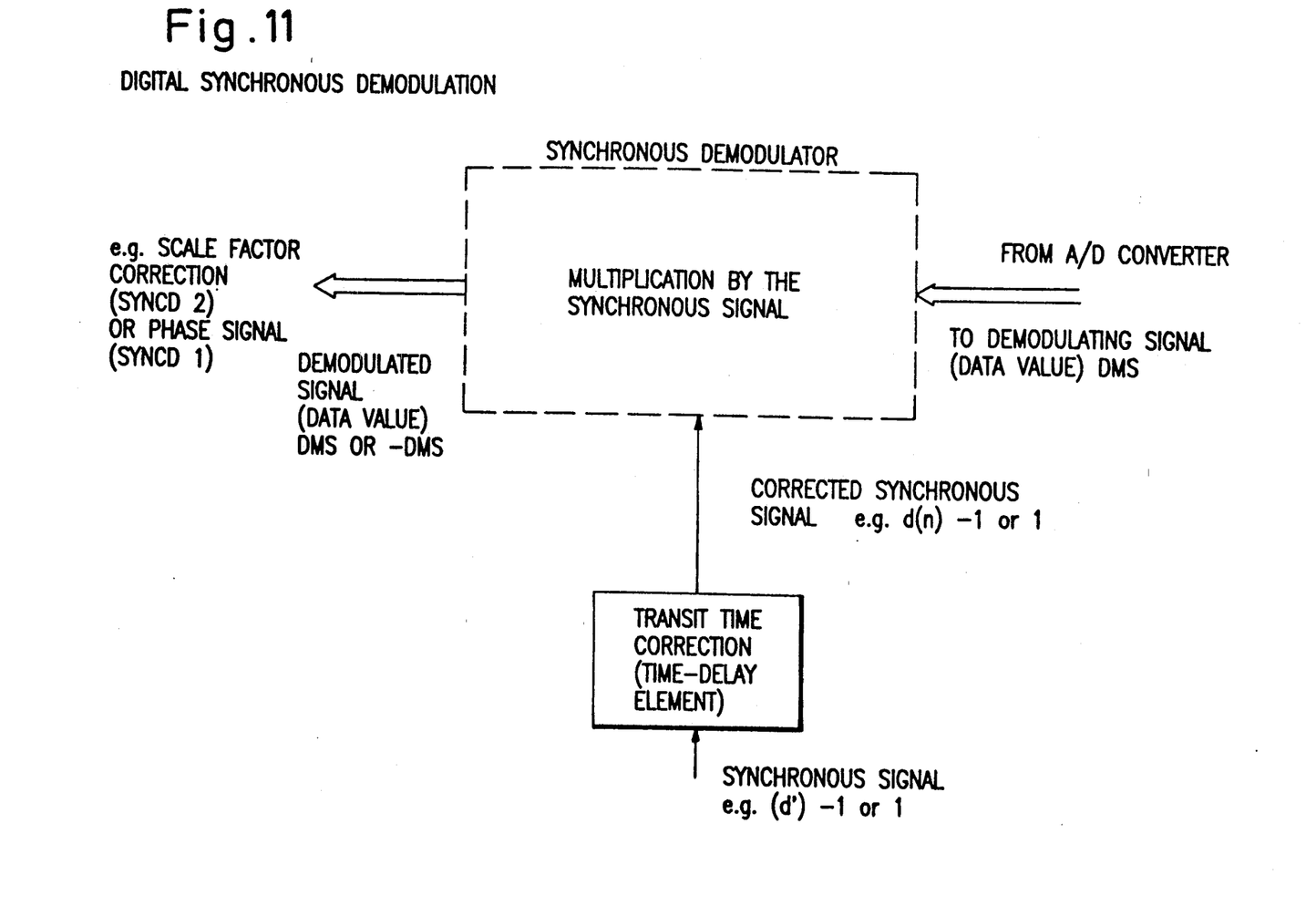
FIG. 11 is a flow diagram of the fundamental arrangement for digital synchronous demodulation.

The principle of synchronous demodulation applied in FIG. 9 is illustrated in FIG. 11, which will be understood by those skilled in the art.

Figure 10:
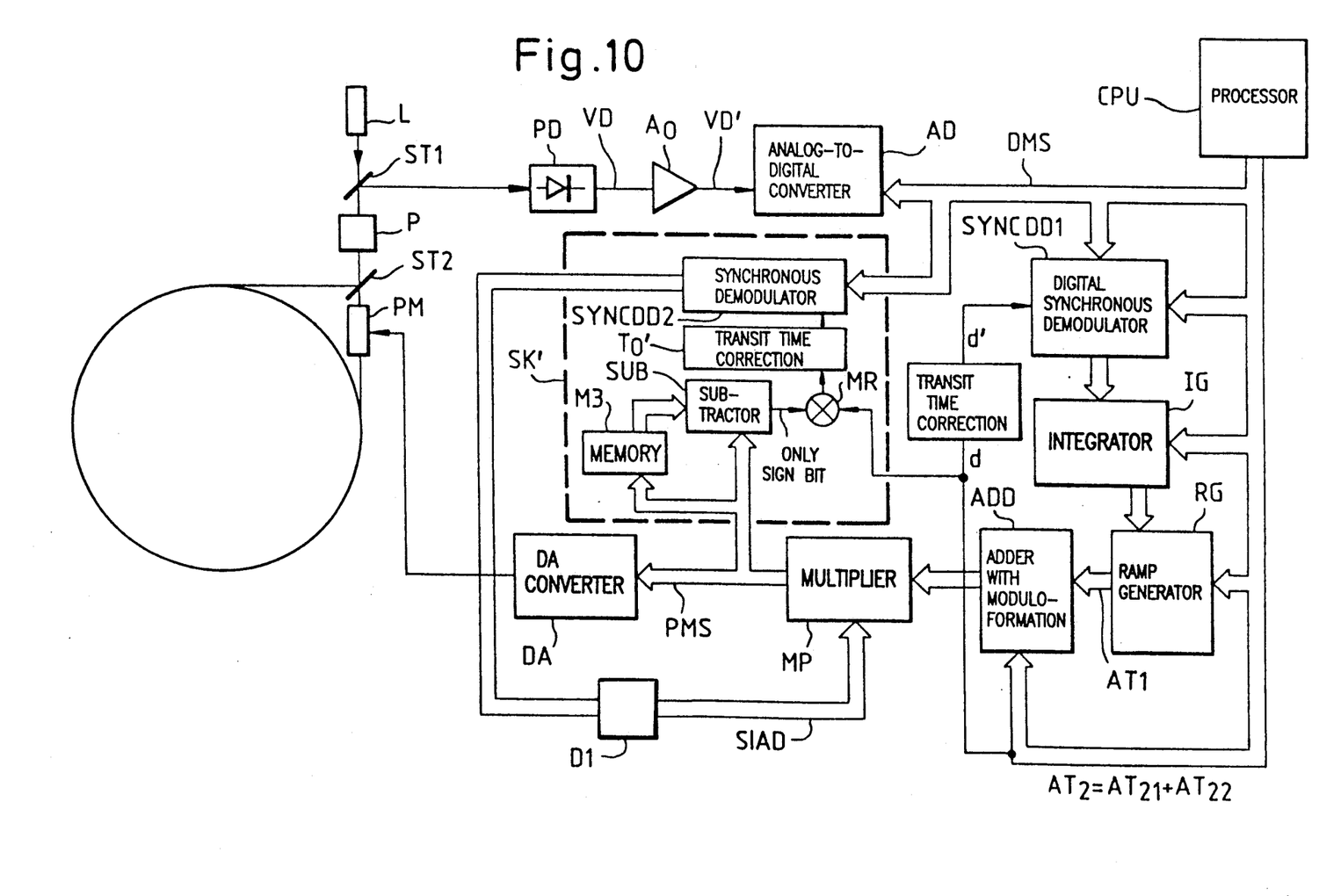
FIG. 10 is a schematic diagram of an interferometer corresponding generally to that of FIG. 9 with supplemented scale factor correction circuit (as in FIG. 8)

FIG. 10 corresponds to FIG. 8 with the scale factor control SK implemented entirely digitally. The second synchronous demodulator SYNCDD2 to which the output of the analog-to-digital converter AD is applied along with the data signal DMS is also implemented as a digital demodulator which is followed by a digital integrator DI that supplies a scale factor correction signal SIAD at its output. Such signal is applied to an input of a multiplier MP whose other input is connected to the output signal of the adder ADD so that the digital-to-analog converter DA is already supplied with the scale factor-corrected signal.

Figure 12:
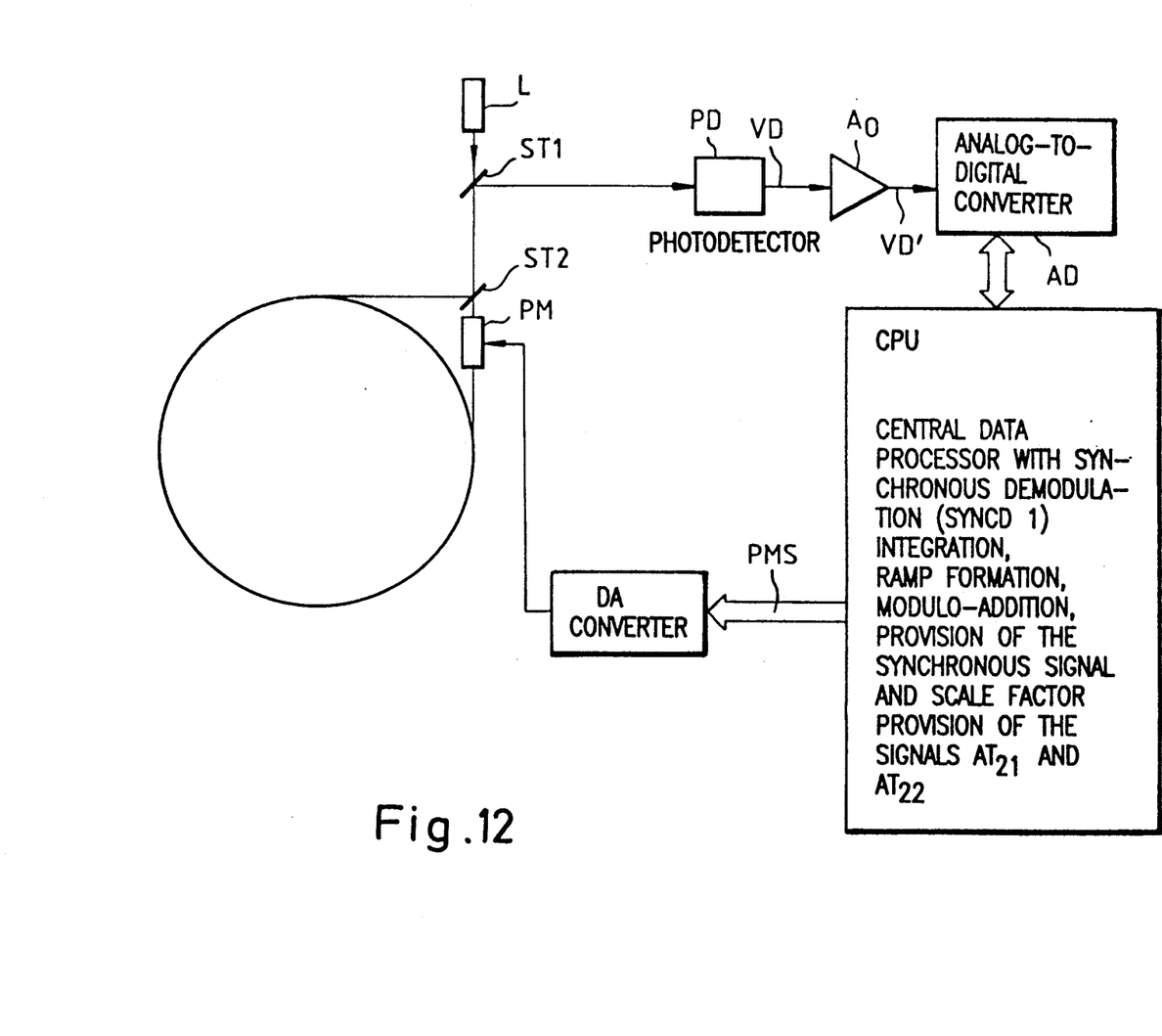
FIG. 12 is a block diagram of an arrangement in which the total processing for providing the trigger signal for the phase modulator runs in a central data processor.

Finally, the arrangement of FIG. 12 shows a pure "digital solution" corresponding in function to that of FIG. 10. All functions of the system are performed in the central data processor CPU. That is to say:

the synchronous demodulation of the synchronous demodulator SYNCDD1;

the integration function of the integrator IG;

generation of the ramp signal $AT_1$ in the ramp generator RG;

provision of the synchronous signal d or d', corrected for transit time;

provision of the scale factor signal SIAD by means of a digital integrator DI;

the components $AT_{21}$ and $AT_{22}$ of the second signal component for the phase modulator trigger signal PMS; and the multiplier MP to perform the scale factor correction.

Thus as can be seen, the present invention provides a method for modulating the trigger signal of a phase modulator of a fiber optic interferometer for measuring rotation rate that avoids errors due to electromagnetic overcoupling and the resulting deadbands without increase in the required modulation range of the phase modulator. By employing statistically independent random generators, the invention avoids crosstalk effects from nearby electronic components permitting multi-axial rotation rate sensors within restricted spaces.

While this invention has been described with reference to its presently preferred embodiment, it is not limited thereto. Rather, this invention is limited only insofar as defined by the following set of claims and includes all equivalents thereof.

What is claimed is:

1. In a fiber optic Sagnac interferometer for measuring rotation rate of the type in which: two light beams originating from a light source, polarized by a polarizer and generated by beam splitting are irradiated into a fiber coil in opposite directions and subsequently reunited; after traversing the polarizer the interference pattern produced is applied to a detector device whose output corresponds to the light intensity of the interference pattern; the two light beams are modulated by a signal with the aid of a phase modulator located in the fiber coil, combined from a plurality of variable components and limited to a value of $2\pi$ by a modulo-operation, a first signal component being a ramp signal generated by an integration process that compensates nonreciprocal incremental phase shifts of the two light beams, and a second signal component representing an integral positive value of $\pi/2$ in each case for a time $t_0$, where $t_0$=transit time of each of the light beams through the fiber coil in the rest condition; the photodetector output signal is amplified and then fed to a first synchronous demodulator clocked with the frequency $f_0=1/t_0$; the demodulated output signal is integrated and fed back, after digital-to-analog conversion, to the phase modulator to generate the ramp signal to compensate nonreciprocal phase shifts of the light beams; and in which a processor supplies the control and synchronization signals for said first synchronous demodulator, an analog-to-digital converter, a digital integrator and a ramp generator, respectively, the improvement comprising:

a) said second signal component consists of a sequence comprising the sum of two component sequences of which (i) the first component sequence is formed from alternately consecutive values of 0 and $\pi/2$ and (ii) the second component sequence comprises values of 0 and $\pi$ that are largely correlation free;

b) said first synchronous demodulator is triggered by the product, d(n), corrected for transit time, of four factors, of which (i) the first factor has the constant value $-1$; (ii) the second factor is $-1$ when the second component is 0 and $+1$ when the second component is $\pi$; (iii) the third factor is $-1$ when the second component of the last preceding modulation clock signal is 0 and $+1$ when the second component of the last preceding modulation clock signal is $\pi$, and (iv) the fourth factor is $-1$ when the first component is 0 and $+1$ when the first component is $\pi/2$; and c) before being fed to said first synchronous demodulator, the product of said four factors is corrected by a transit time compensation $T_0$ which corresponds to the time $t_0$ and to the process time for the summation to obtain the second signal component, to combine said first and second signal components to form said trigger signal for the phase modulator and the digital-to-analog conversion.

2. An interferometer as defined in claim 1, wherein:
a) a scale factor correction circuit compares the sign of the difference between the actual input value of the digital-to-analog converter and the last input value of the digital-to-analog converter with the sign of the actual trigger value (d) of said first synchronous demodulator; and
b) said circuit triggers in time with frequency $1/t_0$ after a transit time compensation, by means of said comparative value, a second synchronous demodulator, whose analog signal to be demodulated is said amplified photodetector output signal and transmits an analog scale factor correction signal to a reference input of said digital-to-analog converter via an integrating amplifier.

3. An interferometer as defined in claim 1, wherein the amplified photodetector output signal is digitized before synchronous demodulation, and the synchronous demodulation is carried out as a digital process.

4. An interferometer as defined in claim 3, wherein:
a) a digital scale factor correction circuit compares the sign of the difference between the actual input value of said digital-to-analog converter and the last input value of said digital-to-analog converter with the sign of the actual trigger value of said first synchronous demodulator; and
b) said circuit triggers, in time with the frequency $1/t_0$—after a transit time compensation, by means of said comparative value, a second digital synchronous demodulator whose digital signal to be demodulated is the output value of said analog-to-digital converter and which generates, via an integrating, digital amplifier, a digital scale factor correction signal by which the sum of the first signal component is multiplied with the second signal component to obtain the input signal for said digital-to-analog converter.

5. An interferometer as defined in claim 1, wherein a central computer performs the digital functions of integration, ramp signal formation, addition with modulo-formation, provision and summation of the first and second components of said second signal component and provision of the synchronous signals for said first and second synchronous demodulators.

6. An interferometer as defined in claim 3, wherein a central computer performs the digital functions of integration, ramp signal formation, addition with modulo-formation, provision of the first and second components, summation to form said second signal component, and demodulation in said first and second synchronous demodulators.

7. An interferometer as defined in claim 1, wherein the second component sequence, which is largely free from correlation, of values 0 and $\pi$ is taken from a pattern of prestored values.

* * * * *